US008831675B2

(12) United States Patent
Wang et al.

(10) Patent No.: US 8,831,675 B2
(45) Date of Patent: Sep. 9, 2014

(54) METHOD FOR OPERATING A WIDE AREA NETWORK MODEM AND A PERSONAL AREA NETWORK MODEM IN A MOBILE COMMUNICATION DEVICE

(75) Inventors: Huai Y. Wang, Coconut Creek, FL (US); Zaffer S. Merchant, Parkland, FL (US); Floyd D. Simpson, Lake Worth, FL (US)

(73) Assignee: Motorola Mobility LLC, Chicago, IL (US)

( * ) Notice: Subject to any disclaimer, the term of this patent is extended or adjusted under 35 U.S.C. 154(b) by 2061 days.

(21) Appl. No.: 11/772,146

(22) Filed: Jun. 30, 2007

(65) Prior Publication Data

US 2009/0004972 A1   Jan. 1, 2009

(51) Int. Cl.
H04W 88/06 (2009.01)
H04W 16/14 (2009.01)
H04W 76/04 (2009.01)

(52) U.S. Cl.
CPC .............. *H04W 16/14* (2013.01); *H04W 88/06* (2013.01); *H04W 76/04* (2013.01)
USPC .................................... 455/552.1; 455/550.1

(58) Field of Classification Search
USPC ...................................................... 455/552.1
See application file for complete search history.

(56) References Cited

U.S. PATENT DOCUMENTS 5,796,727 A *  8/1998  Harrison et al. .............. 370/338
6,329,944 B1  12/2001  Richardson et al.
7,099,671 B2   8/2006  Liang
7,117,008 B2  10/2006  Bajikar
7,133,398 B2  11/2006  Allen et al.
7,146,133 B2  12/2006  Bahl et al.
7,319,715 B1 *  1/2008  Souissi et al. ................. 375/220

(Continued)

FOREIGN PATENT DOCUMENTS

EP          1119137 A1    7/2001
EP          1729463 A    12/2006
WO       2006069352 A1    6/2006
WO       2007002688 A2    1/2007

OTHER PUBLICATIONS

Arto Palin and Mauri Honkanen; "VoIP Call over WLAN with Bluetooth Headset—Multiradio Interoperability Solutions"; IEEE 16th International Symposium on Personal, Indoor and Mobile Radio Communications; Sep. 11-14, 2005; pp. 1560-1564; Piscataway, New Jersey, USA; XP010927402.

(Continued)

*Primary Examiner* — Lester Kincaid
*Assistant Examiner* — Diego Herrera
(74) *Attorney, Agent, or Firm* — Scott M. Garrett; Sylvia Chen

(57) ABSTRACT

A mobile communication device (102) contains both a WAN modem (122) and a PAN modem (134) which operate on interfering radio frequencies. To mitigate interference, and still permit real-time communication operation, the PAN is prevented from transmitting while the WAN is receiving (714). The PAN carries the real-time data via an active link (144) between the PAN modem and a remote device (142). The active link uses a retransmission protocol, which allows recovery of suppressed packets within a given period. The PAN modem is disabled for periods shorter than a maximum time which guarantees success transmission or retransmission of the PAN data. To further aid successful operation of the PAN retransmission operation, the WAN base station aggregates data into a single downlink burst.

15 Claims, 6 Drawing Sheets

(56) References Cited

U.S. PATENT DOCUMENTS

| | | | |
|---|---|---|---|
| 7,522,572 B2* | 4/2009 | Karaoguz | 370/338 |
| 7,542,728 B2* | 6/2009 | Bitran et al. | 455/73 |
| 7,545,787 B2 | 6/2009 | Bitran et al. | |
| 2003/0169697 A1 | 9/2003 | Suzuki et al. | |
| 2004/0162106 A1* | 8/2004 | Monroe et al. | 455/552.1 |
| 2004/0242159 A1 | 12/2004 | Calderon et al. | |
| 2005/0025174 A1 | 2/2005 | Fischer et al. | |
| 2005/0059347 A1* | 3/2005 | Haartsen | 455/41.2 |
| 2005/0246754 A1 | 11/2005 | Desai et al. | |
| 2005/0286476 A1 | 12/2005 | Crosswy et al. | |
| 2006/0205401 A1* | 9/2006 | Palin et al. | 455/425 |
| 2006/0215601 A1* | 9/2006 | Vleugels et al. | 370/328 |
| 2006/0221917 A1* | 10/2006 | McRae | 370/338 |
| 2006/0239223 A1 | 10/2006 | Sherman et al. | |
| 2006/0246932 A1 | 11/2006 | Liang | |
| 2006/0252418 A1 | 11/2006 | Quinn et al. | |
| 2006/0262739 A1* | 11/2006 | Ramirez et al. | 370/311 |
| 2006/0281436 A1 | 12/2006 | Kim et al. | |
| 2006/0292987 A1 | 12/2006 | Ophir et al. | |
| 2007/0066314 A1 | 3/2007 | Sherman et al. | |
| 2007/0124478 A1* | 5/2007 | Abdelhamid et al. | 709/227 |
| 2007/0135162 A1 | 6/2007 | Banerjea et al. | |
| 2007/0153723 A1* | 7/2007 | Souissi et al. | 370/328 |
| 2007/0183383 A1 | 8/2007 | Bitran et al. | |
| 2007/0184835 A1 | 8/2007 | Bitran et al. | |
| 2007/0232358 A1 | 10/2007 | Sherman | |
| 2007/0275746 A1* | 11/2007 | Bitran | 455/509 |
| 2008/0056193 A1 | 3/2008 | Bourlas et al. | |
| 2008/0101279 A1 | 5/2008 | Russell et al. | |
| 2008/0113692 A1 | 5/2008 | Zhao et al. | |
| 2008/0130620 A1 | 6/2008 | Liu et al. | |
| 2008/0130676 A1 | 6/2008 | Liu et al. | |
| 2008/0139212 A1 | 6/2008 | Chen et al. | |
| 2008/0144550 A1 | 6/2008 | Makhlouf et al. | |
| 2008/0146155 A1 | 6/2008 | Makhlouf et al. | |
| 2008/0146156 A1 | 6/2008 | Makhlouf et al. | |
| 2008/0146172 A1 | 6/2008 | Makhlouf et al. | |
| 2008/0205365 A1 | 8/2008 | Russell et al. | |
| 2008/0212542 A1 | 9/2008 | Kung et al. | |
| 2009/0004972 A1 | 1/2009 | Wang et al. | |
| 2009/0005111 A1 | 1/2009 | Wang et al. | |
| 2009/0034444 A1 | 2/2009 | Wang et al. | |
| 2009/0252137 A1 | 10/2009 | Bitran et al. | |

OTHER PUBLICATIONS

Patent Cooperation Treaty; "Notification of Transmittal of the International Search Report and the Written Opinion of the International Searching Authority, or the Declaration" for International Application No. PCT/US2008/068484; Dec. 4, 2008; pp. 1-19.

Patent Cooperation Treaty; "Notification of Transmittal of the International Search Report and the Written Opinion of the International Searching Authority, or the Declaration" for International Application No. PCT/US2008/053555; Nov. 20, 2008; pp. 1-13.

Carl Eklund, et al.; "IEEE Standard 802.16: A Technical Overview of the WirelessMAN(TM) Air Interface for Broadband Wireless Access", IEEE Communications Magazine; Jun. 2002; pp. 98-107; XP-001123517.

Lior Ophir, Yigal Bitran, and Itay Sherman; "Wi-Fi (IEEE 802.11) and Bluetooth Coexistence: Issues and Solutions"; IEEE 15th International Symposium on Personal, Indoor and Mobile Radio Communications; Sep. 5-8, 2004; pp. 847-852; Piscataway, New Jersey, USA; XP-010753961.

Patent Cooperation Treaty; "Notification of Transmittal of the International Search Report and the Written Opinion of the International Searching Authority, or the Declaration" for International Application No. PCT/US2007/081170; Apr. 10, 2008; pp. 1-14.

IEEE; "Standard for Local and Metropolitan Area Networks, Part 16: Air Interface for Fixed and Mobile Broadband Wireless Access Systems, Amendment 2: Physical and Medium Access Control Layers for Combined Fixed and Mobile Operation in Licensed Bands, and Corrigendum 1"; IEEE Std 802.16e-2005 and IEEE Std 802.16-2005/Cor1-2005; Feb. 28, 2006; pp. 357-358; New York, New York, USA.

Patent Cooperation Treaty, "PCT Search Report and Written Opinion of the International Searching Authority" for International Application No. PCT/US2008/068449, Feb. 9, 2009, 14 pages.

Patent Cooperation Treaty, "PCT Search Report and Written Opinion of the International Searching Authority" for International Application No. PCT/US2008/071657, Nov. 28, 2008, 9 pages.

Christian Hoymann and Markus Grauer, "WiMAX Mobility Support", Proceedings of ITG Conference, Oct. 2006, pp. 85-90.

IEEE, Part 16: Air Interface for Fixed and Mobile Broadband Wireless Access Systems; Amendment 2: Physical and Medium Access Control Layers for Combined Fixed and Mobile Operation in Licensed Bands, and Corrigendum 1 (IEEE Std 802.16e-2005 and IEEE Std 802.16e-2004/Cor1-2005), Feb. 28, 2006, pp. i-xl, 1-11, and 228-34.

Zdenek Becvar and Jan Zelenka, "Implementation of Handover Delay Timer into WiMAX", Sixth Conference on Telecommunications, May 2007, pp. 401-404.

Patent Cooperation Treaty, "PCT Search Report and Written Opinion of the International Searching Authority" for International Application No. PCT/US2007/081080, Apr. 8, 2008, 16 pages.

United States Patent and Trademark Office, "Final Rejection" for U.S. Appl. No. 11/772,160, filed Dec. 27, 2010, 13 pages.

United States Patent and Trademark Office, "Office Action Summary" for U.S. Appl. No. 11/674,504, filed Aug. 5, 2009, 19 pages.

United States Patent and Trademark Office, "Office Action Summary" for U.S. Appl. No. 11/674,504, filed Feb. 8, 2010, 17 pages.

United States Patent and Trademark Office, "Office Action Summary" for U.S. Appl. No. 11/772,160, filed Dec. 29, 2009, 14 pages.

United States Patent and Trademark Office, "Office Action Summary" for U.S. Appl. No. 11/772,160, filed Jun. 28, 2010, 14 pages.

United States Patent and Trademark Office, "Notice of Allowance" for U.S. Appl. No. 11/831,170, filed May 20, 2010, 24 pages.

United States Patent and Trademark Office, "Office Action Summary" for U.S. Appl. No. 11/680,067, filed Jun. 25, 2010, 31 pages.

United States Patent and Trademark Office, "Final Rejection" for U.S. Appl. No. 11/674,433, filed Feb. 4, 2010, 19 pages.

United States Patent and Trademark Office, "Office Action Summary" for U.S. Appl. No. 11/674,433, filed Aug. 6, 2009, 21 pages.

* cited by examiner

METHOD FOR OPERATING A WIDE AREA NETWORK MODEM AND A PERSONAL AREA NETWORK MODEM IN A MOBILE COMMUNICATION DEVICE

FIELD OF THE INVENTION

The invention relates generally to mobile wireless communication, and more particularly to mobile wireless communication of real-time information when the mobile communication device is also supporting a wireless personal area network link, and the coexistence of the two wireless systems within the mobile communication device so that operation of the two wireless systems within the mobile communication device do not compromise each other due to radio frequency interference.

BACKGROUND OF THE INVENTION

Mobile communication systems and devices are in widespread use in most metropolitan regions of the world. In many places, wireless communications service is even being deployed where there is no wired communication service, due to the lower cost of infrastructure equipment. As mobile communications technology has matured, various features and additional services have been added beyond simply circuit-switch radiotelephony. Data services have been added so that subscribers can access information over public wide area networks and wireless local area networks. Personal area networking has been implemented on many mobile communication devices to support wire-free connection to nearby accessories and components.

Lately interest has been focused on increasing the information throughput to and from subscriber devices over wide area wireless mobile networks. One technology that has garnered interest for providing high quality, high capacity service is that specified by the IEEE 802.16e specifications, known as the Worldwide Interoperability for Microwave Access, or "WiMAX." This wireless technology provides orthogonal frequency division multiple access channels in frequency bands including frequency bands very near frequencies used by other wireless networks, such as IEEE 802.15.1, known more popularly by the tradename "Bluetooth." While the WiMax technology offers an attractive format for communications and data service, it is expected that it will also be used with personal area network technology, which is entrenched in the marketplace. However, the fact that their operating frequency bands may overlap or be near enough to each other to interfere with each other provides a problem. If the wide area network modem is transmitting when the personal area network modem is attempting to receive, the near field strength of the wide area network transmission will prevent reception of the personal area network information. Likewise, if the personal area network transceiver is transmitting when the wide area network transceiver is attempting to receive information, the strength of the personal area transmission may prevent reception of the wide area network information. Such collisions may slow the effective data rate of some data services, and the impact may be acceptable. However, with interest in voice over data, more commonly known as voice over internet protocol (VoIP), such collisions are unacceptable because, whereas low priority data can be retransmitted, real-time information such as voice data must be received with a certain quality of service to assure the integrity of the call. Therefore there is a need for a means by which the two technologies can coexist in a mobile communication device to provide high quality real-time data service while also supporting personal area networking.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 1:
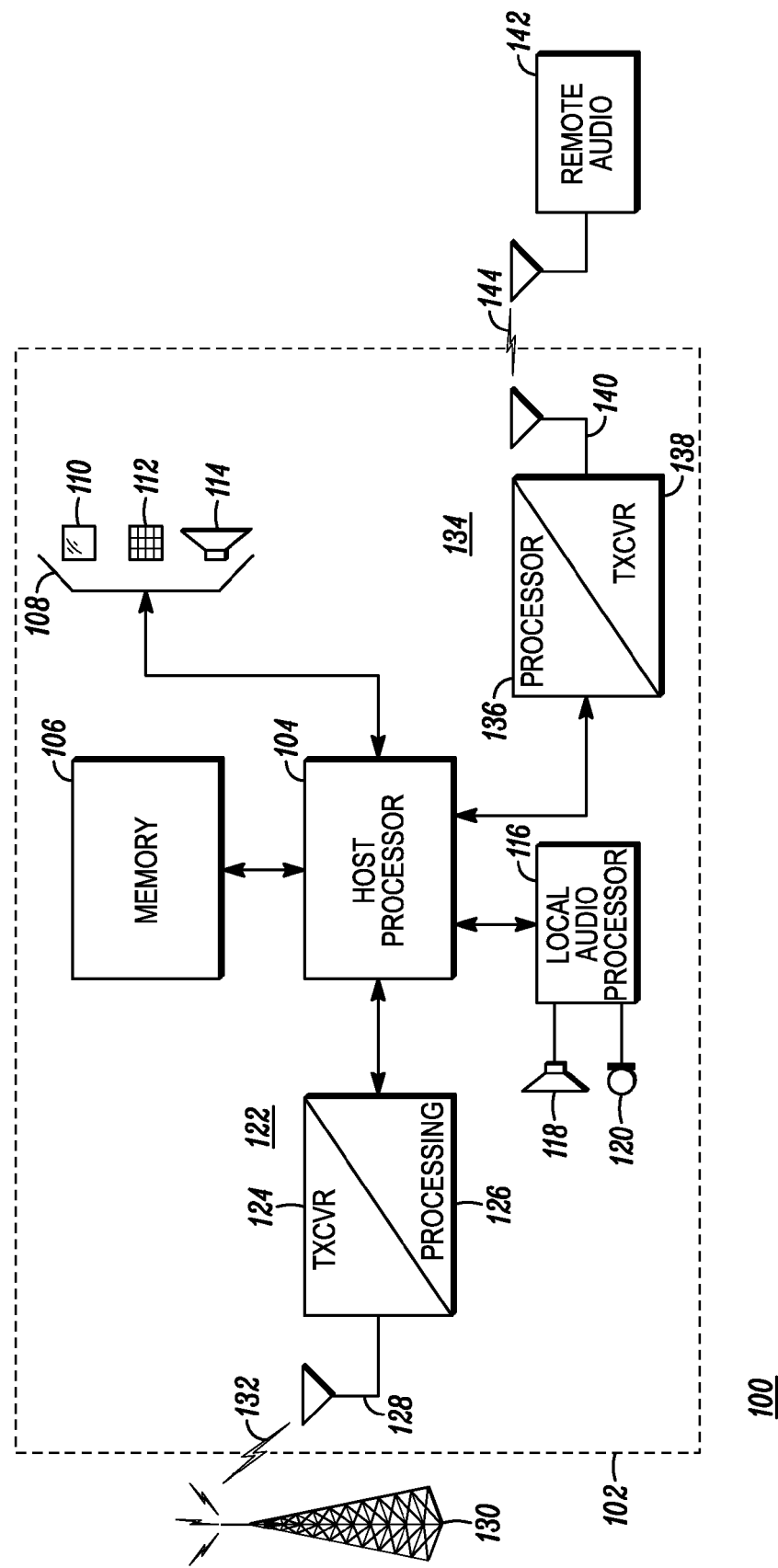
FIG. 1 shows a schematic block diagram of a mobile communication device, in accordance with an embodiment of the invention.

Referring now to FIG. 1, there is shown a schematic block diagram 100 of a mobile communication device 102, in accordance with an embodiment of the invention. A host processor 104 controls operation of the various components and subsystems of the mobile communication device. As shown here the host processor may be an abstraction of one or more microprocessors, digital signal processors and other such processor used routinely in the design of mobile communication devices. The host processor is coupled to a memory 106 which stores instruction code to be executed by the host processor. The memory may include read only memory (ROM) elements for long term storage, as well as executable memory for instantiating data structures and algorithms, and may include volatile and non-volatile components. To facilitate operation of the mobile communication device, a user interface 108 is provided, and includes, for example, a graphical display 110, a keypad and buttons 112, and other tactile, audible, and visual elements 114. To facilitate voice communication the mobile communication device includes an audio processor 116. The audio processor converts digital audio signals into analog audio signals to be played over a audio transducer 118 such as an earpiece or speaker. Likewise the audio processor converts sounds received at a microphone 120 into digital signals to be transmitted by the mobile communication device.

To facilitate mobile communication the mobile communication device comprises a wide area network (WAN) modem 122. The WAN modem is a radio modem having a radio transceiver portion 124 and a processor portion 126. The processor portion prepares data to be sent for transmission, and processes data received over the transceiver for further processing by the host processor. The WAN modem communicates with a WAN base station 130 over an air interface or radio link 132. In accordance with an embodiment of the invention, the WAN modem may operate, for example, in accordance with IEEE specification 802.16e-2005, commonly referred to as the "WiMax" specification, and operate in the 2.5-2.6 GHz band.

To facilitate personal area networking, the mobile communication device also comprises a personal area network (PAN) modem 134. The PAN modem likewise includes a processor portion 136 and a radio transceiver portion 138. The PAN modem communicates with one or more remote devices 142 over a low power radio link 144. Examples of such devices include wireless headsets/headphones and earpieces to facilitate handsfree communication using the mobile communication device. The PAN modem may operate, for example, according to the IEEE 802.15.1 specification, also commonly referred to by the tradename "Bluetooth." The Bluetooth system operates in the 2.4-2.48 GHz band.

Because the WAN and PAN modems operate in such close proximity to each other both physically and in frequency of operation, transmissions by one can interfere with reception of the other one. This is especially significant given that the WAN will be used to carry real-time information such as VoIP calling, which will also be conducted over the PAN to a remote headset, earpiece, or automobile audio system, for example. That means both the WAN and PAN will be active at the same time, both carrying time-sensitive data, and both operating asynchronously with respect to each other.

Figure 2:
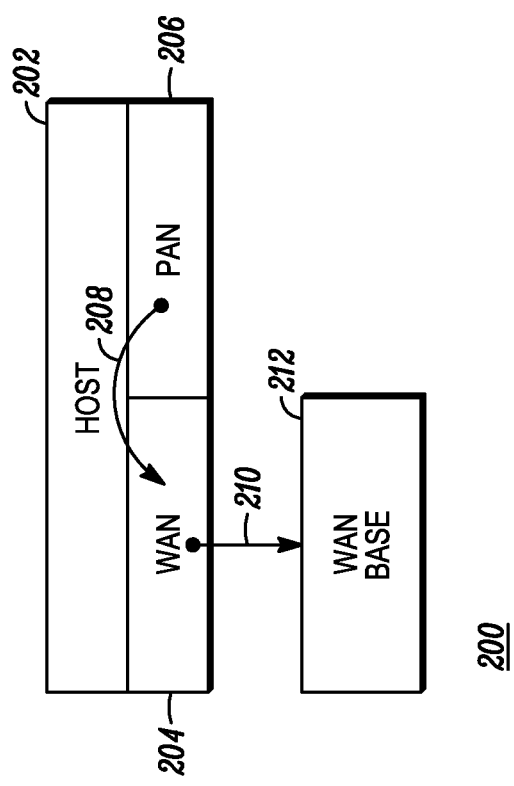
FIG. 2 shows a software system architectural diagram of a mobile communication device, in accordance with an embodiment of the invention.

Referring now to FIG. 2, there is shown a software system architectural diagram 200 of a mobile communication device, in accordance with an embodiment of the invention. A host layer 102 operates over both a WAN layer 204 and a PAN layer 206. Upon commencement of a real-time activity, such as a voice call, the PAN will establish an active link between the PAN modem of the mobile communication device and the remote device. In Bluetooth operation, the active link is known as an extended synchronous connection oriented (eSCO) link. The link operates according to a re-try or retransmission protocol where, within a given period or frame or subframe, if for some reason a packet isn't sent or received, the protocol allows for additional opportunities to send or receive the packet within the period or the frame duration.

The active PAN link may be initiated prior to commencement of the WAN call, or after the call has been established. In either case, the establishment of the active link by the PAN is detected by the host processor. The host processor in turn passes the information to the WAN modem so that the WAN modem may inform the WAN base station 212 of the existence of the active link. The flow of detection and informing the WAN base station of the active link is indicated by arrows 208 and 210. Upon commencement of a real-time communication link over the WAN, such as a voice call, the PAN will be prevented from transmitting when the WAN is due to receive information. Furthermore, when the WAN modem is transmitting, it will overcome the PAN reception.

Upon receiving the information regarding the establishment of the active link, the WAN base station, in accordance with the invention, may configure, or reconfigure the framing format of the link between the WAN base station and the mobile communication device to facilitate successful operation of the retransmission protocol of the active link of the PAN. Thus, downlink information bursts will be arranged so that the PAN transmissions will not be disabled for a period of time longer than is needed for a successful re-try or retransmission of the data packet of a present frame or subframe of the PAN. Similarly, on the uplink WAN transmissions, the duration of transmissions will be controlled so that retransmissions can be successfully made within a give period or frame.

Figure 3:
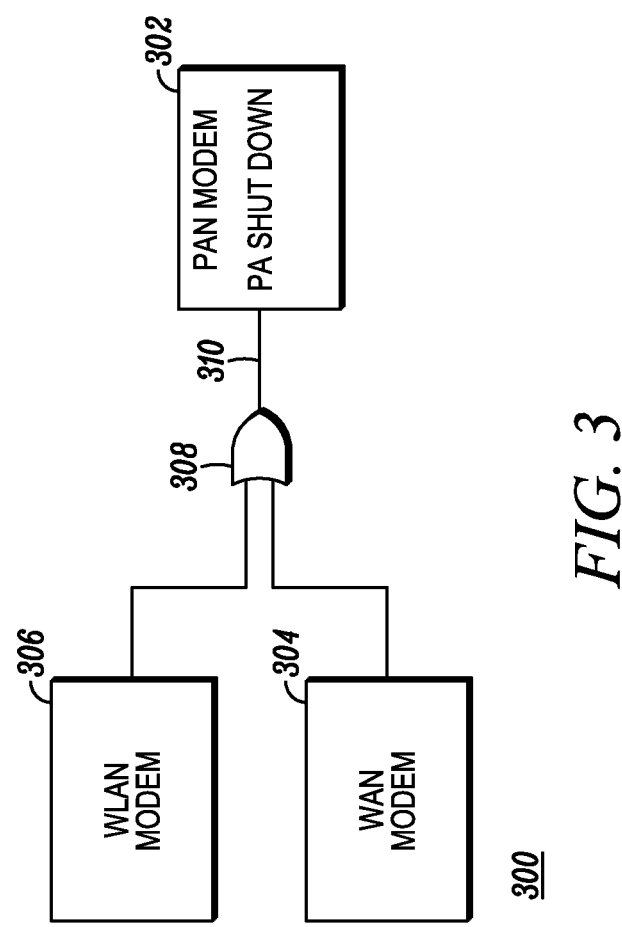
FIG. 3 shows a logic circuit arrangement for a mobile communication device to preempt transmission by a personal area network modem of the mobile communication device, in accordance with an embodiment of the invention.

Referring now to FIG. 3, there is shown a logic circuit arrangement 300 for a mobile communication device to block or preempt transmission by a PAN modem 302 of the mobile communication device, in accordance with an embodiment of the invention. The mobile communication device includes a PAN modem and a WAN modem 304, and may also include a wireless local area network (WLAN) modem 306. Since WLAN operation as specified by the IEEE specification 802.11 specifications also operates in a similar band as the PAN, the WLAN may also preempt or disable transmissions by the PAN. Such operation is shown in published U.S. patent application no. 2006/0205401 A1, titled "METHOD AND APPARATUS FOR VOIP OVER WLAN TO BLUETOOTH HEADSET USING ADVANCED ESCO SCHEDULING." The WAN and WLAN modems are multiplexed though a logical OR gate 308 to a power amplifier shutdown line 310. If the WLAN modem is not present in the mobile communication device, than the WAN line would be directly connected to the shutdown line 310. When either the WAN or WLAN modems assert a shutdown signal, the PAN transmitter shuts or, or prevents operation of its transmitter so as not to interfere with reception at the WLAN or WAN.

Figure 4:
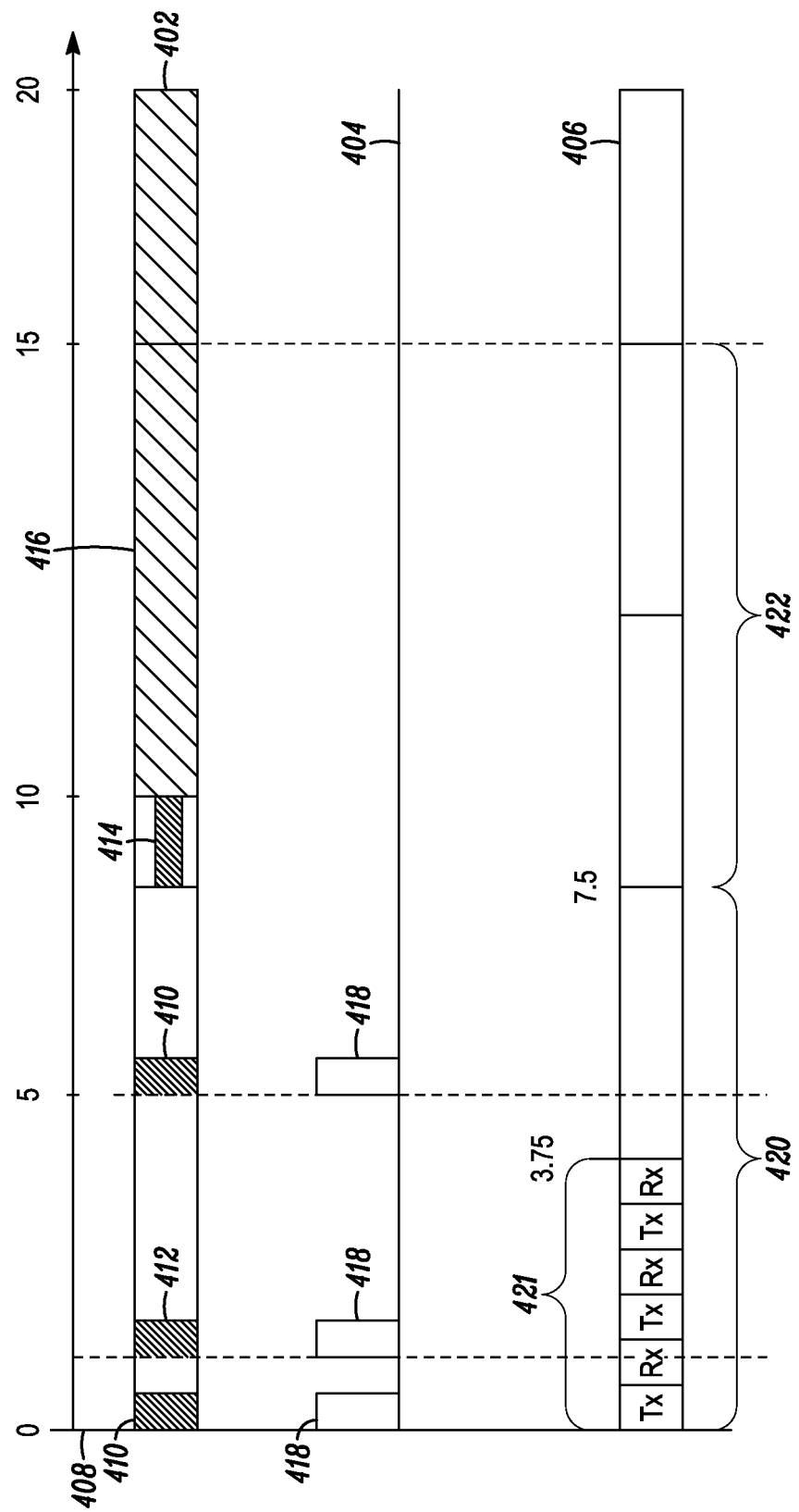
FIG. 4 shows a timing diagram

Referring now to FIG. 4, there is shown a timing diagram 400 of operation of the WAN and PAN in a manner that facilitates coexistence, in accordance with an embodiment of the invention. The WAN activity 402 includes both reception and transmission. When the WAN modem must receive information, it asserts a shutdown signal 404. The shutdown signal prevents a PAN modem 406 from transmitting. In the present example the WAN is a WiMax modem and the PAN is a Bluetooth modem. Although shown here starting at the same time, it is more likely that the WAN and PAN operation will be operating asynchronously. However they occur with respect to each other, the principles illustrated here apply to both the WAN and PAN frame information. Upon commencement of a WAN frame, the WAN base station transmits a header portion 408, containing a Preamble Frame Control and a frame map 410. The map indicates to the WAN modem where in the frame the downlink data 412 for the mobile communication device occurs. The map 410 also indicates whether the WAN modem of the mobile communication device is allocated bandwidth to transmit its uplink data 414 in the subsequent frame. Each time the WAN modem is due to receive information, whether in a header portion or payload 412, the PA shutdown 418 is asserted. According to the present example, the WAN operates using a 2/2 sleep cycle framing format where 2 frames are used to transact data, and 2 frames 416 are used for placing the WAN modem in sleep mode. In the present example, each WAN frame is 5 milliseconds in duration and the ration between uplink and downlink subframes is 70/30.

The PAN framing uses frame periods 420, 422 of 7.5 ms duration with alternating transmit and receive slots in each subframe period 421. However, each period 420, 422 is used to transmit and receive one packet in each direction during active link operation. So, if the PAN has information to transmit, and transmission is disabled in the first transmit slot of the present period, the PAN has two more opportunities in the present period to transmit the same packet. Similarly, if transmission by the WAN 414 occurs and suppresses reception at the PAN, the PAN has sufficient retransmission opportunity within a given period to recover.

Figure 5:
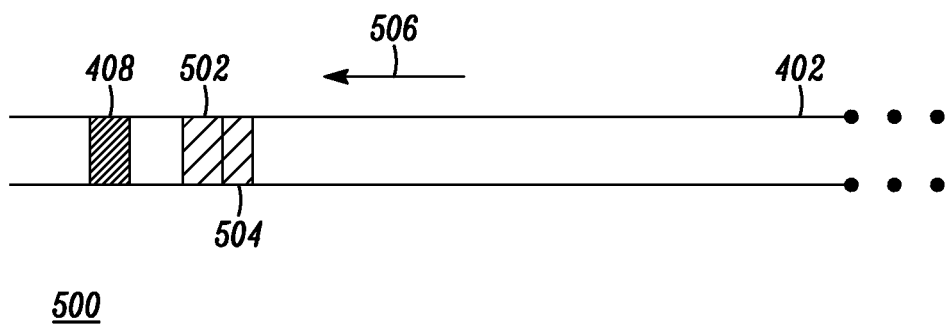
FIG. 5 shows a framing diagram of a portion of a WAN frame in accordance with an embodiment of the invention.

Referring now to FIG. 5, there is shown a framing diagram 500 of a portion of a WAN frame, in accordance with an embodiment of the invention. To Facilitate successful operation of the retransmission protocol of the PAN, the WAN base station, upon receiving notification that the active link is in use at the mobile communication device, configures the downlink burst destined to the mobile communication device using active PAN link operation by aggregating the management, real-time, and non-real time data 502, 504, and giving it priority of occurrence in the frame by allocating it so that the aggregated data occurs as close to the beginning of the frame, after the MAP 408, as is possible, as indicated by arrow 506. By aggregating the data and moving it forward in the downlink subframe, the effect of disabling PAN transmission is more likely overcome by the retransmission operation of the WAN.

Figure 6:
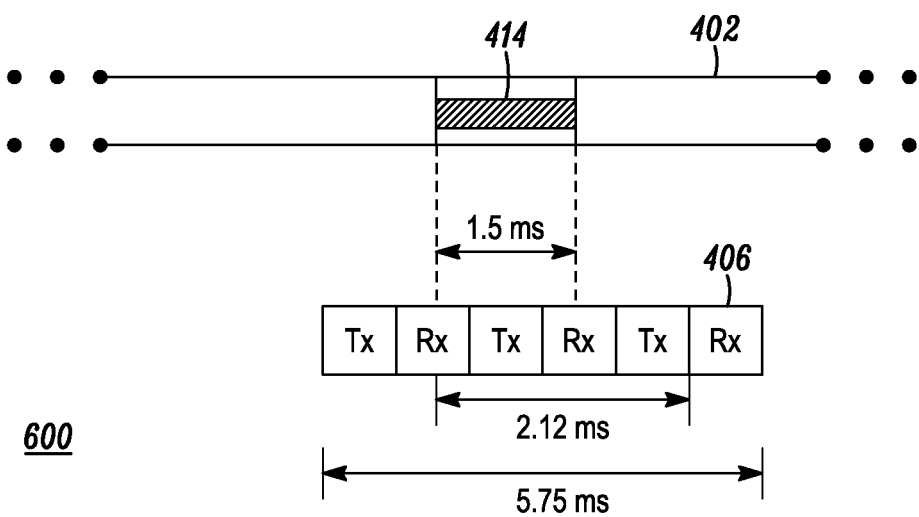
FIG. 6 shows a framing diagram of an uplink portion of the WAN frame of FIG. 5.

In FIG. 6, there is shown a framing diagram 600 showing the uplink portion 414 of the WAN frame. In this example, the duration of the uplink period allocated to the mobile communication device is 1.5 ms. When the WAN transmits, it suppresses reception at the PAN due to radio interference. Thus, to trigger the retransmission operation of the PAN to recover the suppressed packet, the duration of the uplink transmission must be selected to be shorter than a retransmission time of the PAN framing, so as not to prevent either transmission in the first slot, recovery transmission in a subsequent transmit slot. With 2 retransmission slot pairs allowed in the Bluetooth eSCO link with a period of 3.75 ms, there will be at least one successful transmit and one successful receive slot as long as the WAN transmission lasts no more than 2.12 ms. Thus, the retransmit time for a Bluetooth eSCO link is 2.12 ms. Since one third of the PAN frame must not be disabled to allow guarantee one transmit and one receive slot will be successful, the PAN cannot be disable for more than 2.5 ms. Thus, in addition to not disabling the PAN for more than 2.12 ms, there must be a wait period of at least 1.63 ms before the PAN may be disabled again.

Figure 7:
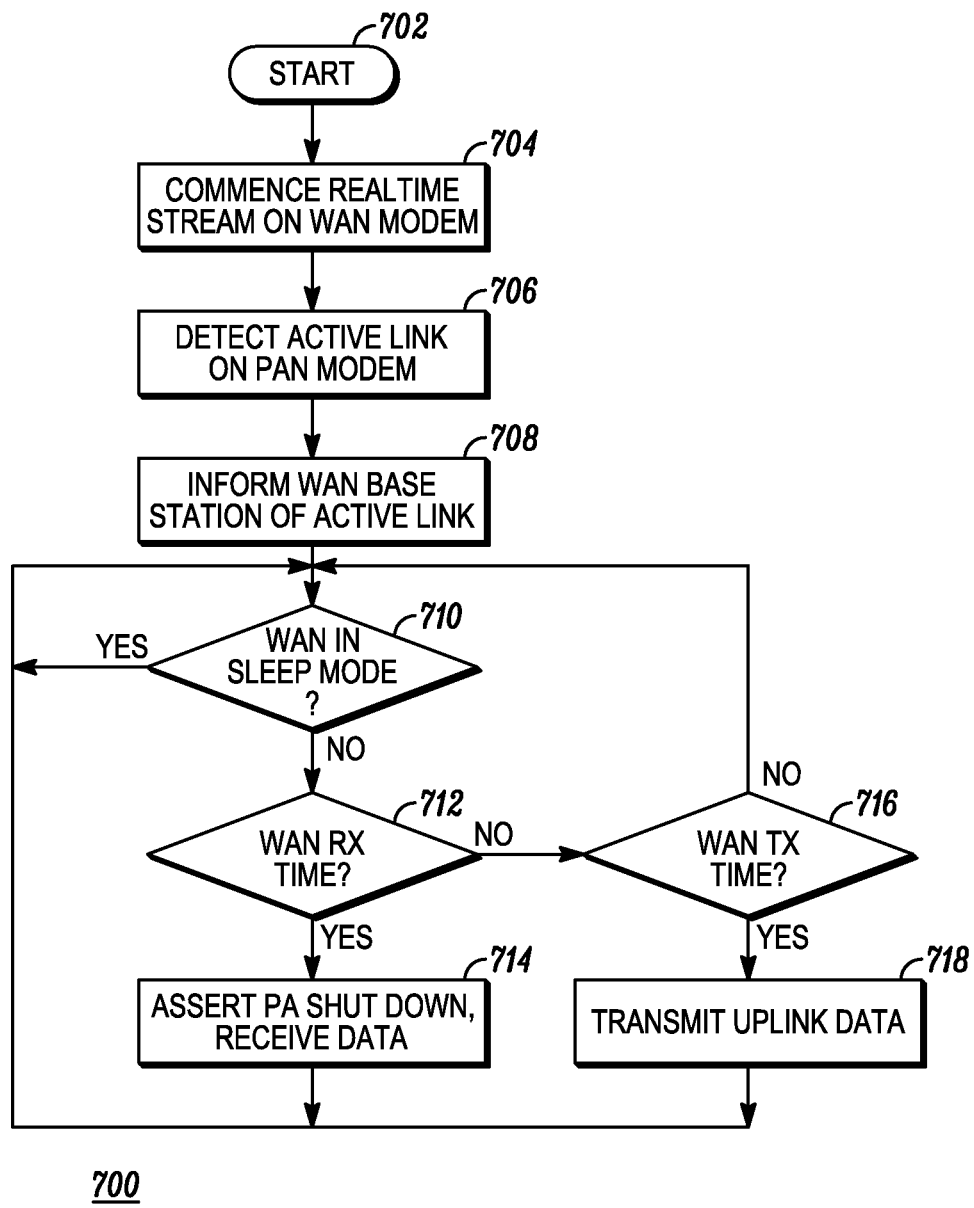
FIG. 7 shows a flow chart diagram of a method for operating a WAN modem and a PAN modem in a mobile communication device.

FIG. 7 shows a flow chart diagram 700 of a method for operating a WAN modem and a PAN modem in a mobile communication device, where the WAN and PAN operate on similar frequencies. At the start 702 the mobile communication device is powered up and ready to engage in communication activity. In the present example, the mobile communication device commences a real-time data stream communication 704 over the WAN, such as a voice call. The process of call set up and establishment is well known. The mobile communication device also detects the presence of an active link at the PAN modem between the PAN modem and a remote device (706). The order in which these two events occur is irrelevant as the user of the mobile communication device may use the remote device to control the mobile communication device to commence the call, or may switch to using the remote device after the call begins. Once the active link is detected, the mobile communication device informs the WAN base station presently serving the mobile communication device of the existence of the active link. The notification causes the WAN base station to configure the frame format in a way that facilitates successful retransmission operation of the active link. The Wan modem will also set up sleep mode operation if it hasn't already done so, and adapt its sleep pattern to have a 2 frame listen or active interval and a 2 frame sleep interval. While the WAN modem is not in a sleep mode 710, the WAN method is split between being idle, receiving 712, or transmitting 716. When it is time to receive, the PAN transmission is disabled by asserting a shutdown signal to the PAN 714, for example. The shutdown period is selected so as not to exceed a period of time that would compromise the retransmission operation of the active link. Similarly, when it is time to transmit 716, the WAN modem simply transmits 718 regardless of what the PAN is doing. However, the transmit time is selected to be less than a maximum duration, beyond which retransmission operation of the PAN would be compromised.

Thus, the invention provides for a method for operating a WAN modem and a PAN modem in a mobile communication device, where the WAN and PAN modems operate on frequencies which interfere with each other. The method includes detecting the presence of an active link between the PAN modem and a remote device. The active link carries real-time data to the remote device and uses an in-frame retransmission protocol. The WAN commences a real-time data stream, such as a voice call. The WAN modem informs the WAN base station that the mobile communication device is presently supporting the active link over the PAN modem. While engaged in the real-time calling operation, the method commences disabling transmission by the PAN modem when the WAN modem is due to receive information from the WAN base station. The PAN modem transmissions are disabled for periods of time not exceeding a retransmission time of the in-frame retransmission protocol. The retransmission time is the maximum time which the active link can be disabled, but still transmit a present pack in a present frame. Otherwise, PAN transmissions are enabled. The method commences transmitting information over the WAN modem to the WAN base station during a transmission time such that the transmission time has a duration not exceeding the retransmission time of the in-frame retransmission protocol. In one embodiment of the invention, upon detecting the present of the active link and informing the WAN base station that the mobile communication device is presently supporting the active link, the framed format of the real-time data stream is reconfigured from a different format to permit successful operation of the retransmission protocol of the PAN. In another embodiment of the invention, upon informing the WAN base station of the active link, the WAN base station aggregates data of the real-time data stream with non real-time data to be transmitted to the mobile communication device to provide an aggregated data burst, and the aggregated data burst is given priority of occurrence in a downlink frame to occur near or adjacent a header portion of the downlink frame. In another embodiment of the invention, the framed format comprises a first frame for receiving control information and downlink information, a second frame for transmitting uplink information from the mobile communication device to the WAN base station over the WAN modem, followed by two frames where the WAN modem is set to a sleep mode. In another embodiment of the invention, the retransmission protocol of the PAN comprises a frame structure providing multiple transmission periods and receive periods in a frame, and wherein when the PAN modem is disabled, the WAN modem does not transmit for a time period longer than a duration which allows the occurrence of a full transmission period and a full receive period in a PAN frame. The invention may further embody a retransmission protocol operating with a frame timing with two subframes where a subframe has a length of 3.75 milliseconds, The PAN commences disabling transmission for not more than 2.12 milliseconds with at least 1.63 milliseconds between disabling events. In one embodiment of the invention, the real-time data stream may be a voice over internet protocol (VoIP) stream. The remote device may be an audio headset, and the active link carries the VoIP stream to the audio headset.

This invention can be embodied in other forms without departing from the spirit or essential attributes thereof. Accordingly, reference should be made to the following claims, rather than to the foregoing specification, as indicating the scope of the invention.

What is claimed is:

1. A method for operating a wide area network modem and a personal area network modem in a mobile communication device, comprising:
    detecting the presence of an active link between the personal area network modem and a remote device, wherein the active link carries real-time data to the remote device and uses an in-frame retransmission protocol;
    commencing a real-time data stream over the wide area network modem, the real-time data stream being received from a wide area network base station in a framed format;
    informing the wide area base station that the mobile communication device is presently supporting the active link over the personal area network modem;
    disabling transmission by the personal area network modem when the wide area network modem is due to receive information from the wide area network base station, wherein the personal area network modem transmissions are disabled for periods of time not exceeding a retransmission time of the in-frame retransmission protocol, and otherwise enabling transmission by the personal area network; and
    transmitting information over the wide area network modem to the wide area base station during a transmission time and wherein the transmission time has a duration not exceeding the retransmission time of the in-frame retransmission protocol.

2. A method for operating a wide area network modem and a personal area network modem in a mobile communication device as defined in claim 1, wherein, upon detecting the present of the active link and informing the wide area network base station that the mobile communication device is presently supporting the active link, the framed format of the real-time data stream is reconfigured to permit successful operation of the retransmission protocol of the personal area network.

3. A method for operating a wide area network modem and a personal area network modem in a mobile communication device as defined in claim 2, wherein, upon informing the wide area network base station of the active link, the wide area network base station aggregates data of the real-time data stream with non real-time data to be transmitted to the mobile communication device to provide an aggregated data burst, and wherein the aggregated data burst is given priority of occurrence in a downlink frame.

4. A method for operating a wide area network modem and a personal area network modem in a mobile communication device as defined in claim 2, wherein the framed format comprises a first frame for receiving control information and downlink information, a second frame for transmitting uplink information from the mobile communication device to the wide area base station over the wide area network modem, followed by two frames where the wide area network modem is set to a sleep mode.

5. A method for operating a wide area network modem and a personal area network modem in a mobile communication device as defined in claim 4, wherein the retransmission protocol operates with a frame timing with two subframes where a subframe has a length of 3.75 milliseconds, disabling transmission by the personal area network modem and transmission by the wide area network modem does not exceed 2.12 milliseconds with at least 1.63 milliseconds between disabling the personal area network and transmission by the wide area network.

6. A method for operating a wide area network modem and a personal area network modem in a mobile communication device as defined in claim 1, wherein the retransmission protocol of the personal area network comprises a frame structure providing multiple transmission periods and receive periods in a frame, and wherein the personal area network modem is not disabled, and the wide area network modem does not transmit for a time period longer than a duration which allows the occurrence of a full transmission period and a full receive period in a frame.

7. A method for operating a wide area network modem and a personal area network modem in a mobile communication device as defined in claim 1, wherein the real-time data stream is a voice over internet protocol (VoIP) stream.

8. A method for operating a wide area network modem and a personal area network modem in a mobile communication device as defined in claim 7, wherein the remote device is an audio headset, the active link carries the VoIP stream to the audio headset.

9. A method of operating a wide area network to support mobile data communication between a wide area network base station and a mobile communication device, the mobile communication device having a wide area network modem and a personal area network modem, the personal area network modem providing a wireless connection to a remote device, the method comprising:
    establishing an active link between the personal area network modem and the remote device, the active link for carrying real-time data to the remote device and operating according to an in-frame retransmission protocol;
    commencing a wide area network communication link between the mobile communication device and the wide area network base station via the wide area network modem, the wide area network communication link operated according to a framed format and carrying real-time data;
    informing the wide area base station of the presence of the active link;
    disabling transmission by the personal area network modem when the wide area network modem is due to receive data from the wide area network base station over the wide area network communication link; and
    configuring the wide area network communication link to allow successful retransmission operation of the active link.

10. The method of claim 9, wherein, upon informing the wide area network base station of the active link, the wide area network base station aggregates data of the real-time data stream with non real-time data to be transmitted to the mobile communication device to provide an aggregated data burst, and wherein the aggregated data burst is given priority of occurrence in a downlink frame to occur near or adjacent a header portion of the downlink frame.

11. The method of claim 10, wherein the framed format comprises a first frame for receiving control information and downlink information, a second frame for transmitting uplink information from the mobile communication device to the wide area base station over the wide area network modem, followed by two frames where the wide area network modem is set to a sleep mode.

12. The method of claim 10, wherein the retransmission protocol of the personal area network comprises a frame structure providing multiple transmission periods and receive periods in a frame, and wherein the personal area network modem is not disabled, and the wide area network modem does not transmit for a time period longer than a duration which allows the occurrence of a full transmission period and a full receive period in a frame.

13. The method of claim 12, wherein the retransmission protocol operates with a frame timing with two subframes where a subframe has a length of 3.75 milliseconds, disabling transmission by the personal area network modem and transmission by the wide area network modem does not exceed 2.12 milliseconds with at least 1.63 milliseconds between disabling the personal area network and transmission by the wide area network.

14. The method of claim 10, wherein the real-time data stream is a voice over internet protocol (VoIP) stream.

15. The method of claim 14, wherein the remote device is an audio headset, the active link carries the VoIP stream to the audio headset.

* * * * *